J. G. HUNTINGTON.
Horse Hay-Rake.
No. 96,005.
Patented Oct. 19, 1869.
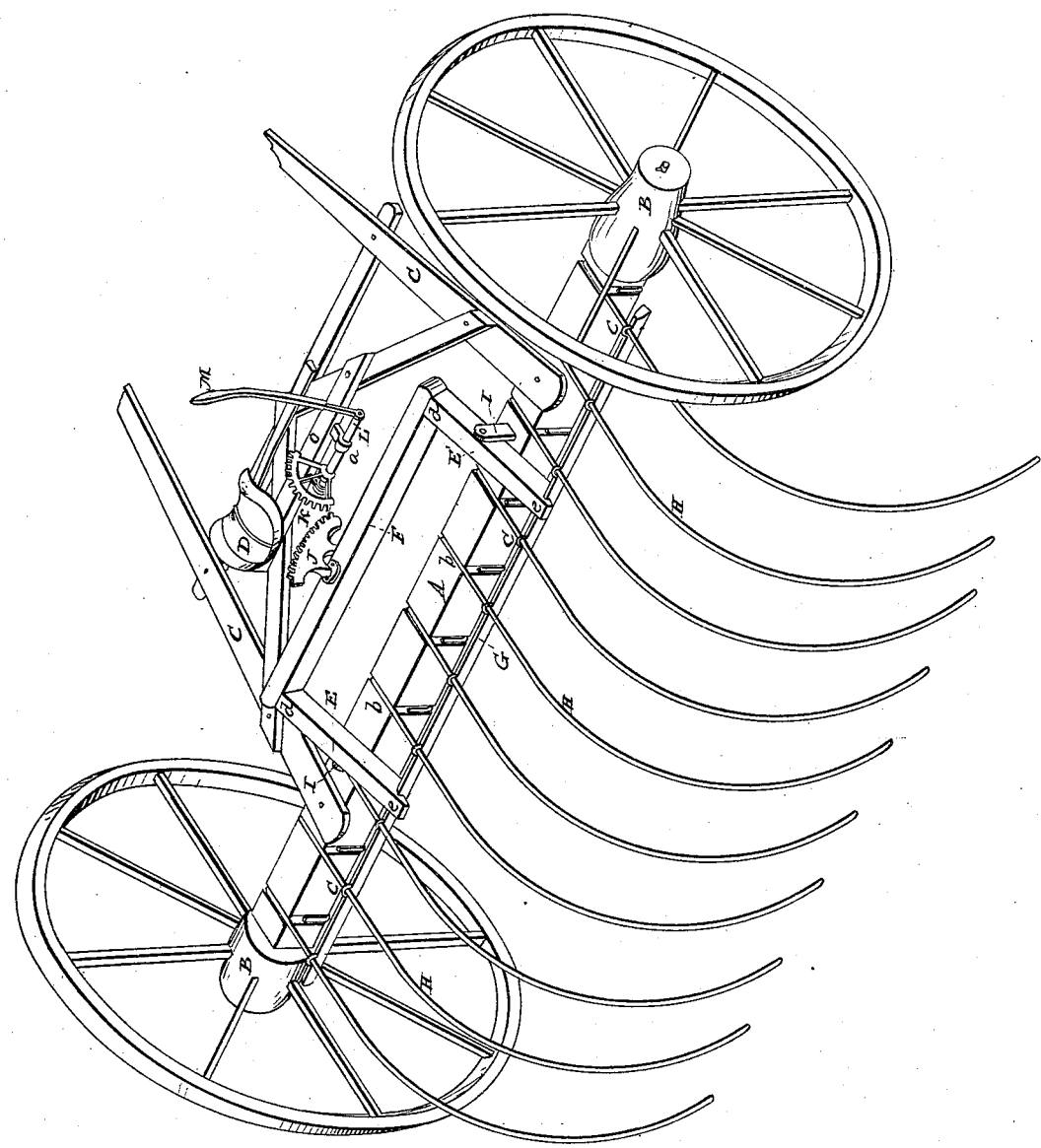
WITNESSES:
INVENTOR:

United States Patent Office.

J. G. HUNTINGTON, OF ATKINSON, ASSIGNOR TO HIMSELF AND F. E. WILSON, OF NORTH BRADFORD, MAINE.

Letters Patent No. 96,005, dated October 19, 1869.

---

IMPROVEMENT IN HORSE HAY-RAKES.

---

The Schedule referred to in these Letters Patent and making part of the same.

---

*To all whom it may concern:*

Be it known that I, J. G. HUNTINGTON, of Atkinson, in the county of Piscataquis, and State of Maine, have invented certain new and useful Improvements in Horse Hay-Rakes; and I do hereby declare that the following is a full and exact description thereof, reference being had to the accompanying drawings, and to the letters of reference marked thereon.

The nature of my invention consists in so combining the teeth H H H with the axle A, and with the lever-frame G E E' F, as to allow of a more simple construction and easy operation than can be obtained by any horse hay-rake heretofore manufactured or used.

In the accompanying drawings, the rake is seen in perspective, and consists of the axle and rake-head A, wheels B B, teeth H H H, lever-frame G E E' F, standards I I, toothed sectors J K, handle or lever M, seat D, shafts C C, together with such braces and subordinate parts as are shown in the drawings.

To enable others skilled in the art to make and use my invention, I will now proceed to describe its construction and operation.

I construct the rake-head, or axle A, with grooves *b b*, to receive the heads of the teeth, and hold them in position.

I provide wheels B B, and attach the shafts C C, properly braced and supporting the seat D.

I provide the teeth H H H, and attach them to the axle A by bending them around in the grooves *b b*, in such a manner as to allow them to play freely on the axle.

I provide the lever-frame G E E' F, and suspend it on pivots in the standards I I, in such a manner that it may be used as a lever to raise the teeth when desired.

I provide the toothed sector J, and attach it to the bar F, as shown in the drawings, and I provide the toothed sector K, revolving on the shaft L, and actuated by the lever M.

I provide the boxes or sockets *a a*, which support and hold the shaft L, and attach them to the bar O by shanks driven or screwed into the bar.

I provide the staples *c c c*, and fasten them to the bar G, to guide and keep in place the teeth H H H, while at the same time allowing the bar G to move backward and forward longitudinally on the teeth.

In operation, the machine is usually started with the different parts in the positions shown in the drawings.

As the hay accumulates in the teeth, and it becomes desirable to dump it, the lever M is brought backward, the teeth on the sector K engage with the teeth on the sector J, the sector K partially revolves backward, causing the sector J to partially revolve forward, depressing the bar F and the ends *d d* of the levers E E', and elevating the ends *e e* of the levers, and with them the bar G, thus raising the teeth to any desired elevation. The teeth are then lowered by a reverse operation.

It will readily be seen that by the independent motion permitted to the teeth, each tooth may rise so as to pass over any obstruction of at least a foot in height, without lifting the other teeth, and may also fall into hollows and inequalities of the ground independently of the other teeth.

The leverage obtained by the arrangement of this rake, together with the advantage gained by lifting only the teeth without lifting the rake-head, renders it the most easily-handled horse-rake known to me ever manufactured, while, owing to its simplicity of construction, it will seldom get out of repair, and may be readily adjusted.

It will be seen that the teeth are not affixed to a cross-bar above or near the axle, but are placed directly upon the axle itself, and that their inner ends are not secured rigidly, but are entirely free, so that while they cannot be detached accidentally, yet they are perfectly free, by reason of the grooves on the axle, to turn upon it as a centre without undergoing any strain whatever, or uncoiling the bend which keeps them to place.

By this means there is an unrestrained independence of movement of each tooth upward, regardless of the others, limited only by the height of the loops in the bar G of the lifting-frame.

It will also be observed that the toothed segment J is not secured directly upon the axle, or upon a bar above and in close proximity to the axle, as heretofore, but upon a frame, so as to give considerable leverage between the point where this segment derives its motion by means of handle M, and the points which serve as the axis of the frame, thus rendering it much more easily operated. Also, this frame is centred upon pivots which are not in coincidence with the centre of motion of the teeth, but considerably above it, thus causing the loops of bar G, when in the act of lifting the teeth, to ride upon the teeth, and thus constantly increase the leverage by which they are lifted.

I claim—

The attachment of each tooth directly to the axle, by coiling it partially around a cylindrical groove or guide thereon, and leaving the end of the bend or coil free and unsecured, thus permitting a separate and independent rising and falling motion to each tooth, and without any strain thereon, as shown and described.

Also, the arrangement of the frame G E E' F upon the axle, and in relation to the loosely-hung teeth, turning on the axle as described, and so that the centre of motion of the teeth shall not coincide with that of the frame.

Also, the combination of the axle A, loosely-hung teeth H H, lever-frame sectors J and K, and lever M, when these parts are arranged and operate as described.

J. G. HUNTINGTON.

Witnesses:
J. F. WILESON,
D. HUTCHINSON.